United States Patent [19]
Tiefenbacher et al.

[11] Patent Number: 5,711,908
[45] Date of Patent: Jan. 27, 1998

[54] PROCESS FOR MANUFACTURING COMPOSTIBLE THIN-WALLED MOLDED ARTICLES BASED ON STARCH

[75] Inventors: Karl Tiefenbacher; Franz Haas, Sr., both of Vienna; Johann Haas, Klosterneuburg, all of Austria

[73] Assignee: Franz Haas Waffelmaschinen Industriegesellschaft m.b.H., Vienna, Austria

[21] Appl. No.: 652,542
[22] PCT Filed: Dec. 6, 1994
[86] PCT No.: PCT/AT94/00187
  § 371 Date: Jun. 3, 1996
  § 102(e) Date: Jun. 3, 1996
[87] PCT Pub. No.: WO95/15698
  PCT Pub. Date: Jun. 15, 1995

[30] Foreign Application Priority Data

Dec. 6, 1993 [AT] Austria ..................... 2466/93

[51] Int. Cl.$^6$ ................ B29C 39/02; B29C 71/00
[52] U.S. Cl. ............ 264/232; 106/125.1; 106/136.1; 106/144.1; 106/145.1; 106/158.1; 106/159.1; 106/206.1; 264/300; 264/330
[58] Field of Search .................. 264/232, 300, 264/330; 106/125.1, 136.1, 144.1, 145.1, 158.1, 159.1, 206.1

[56] References Cited

U.S. PATENT DOCUMENTS

| | | | |
|---|---|---|---|
| 4,076,846 | 2/1978 | Nakatsuka et al. | 426/62 |
| 5,320,669 | 6/1994 | Lim et al. | 106/127.1 |

FOREIGN PATENT DOCUMENTS

| | | |
|---|---|---|
| 376 201 | 7/1990 | European Pat. Off. . |
| 513 106 | 11/1992 | European Pat. Off. . |
| 546 539 | 6/1993 | European Pat. Off. . |
| 608 031 | 7/1994 | European Pat. Off. . |
| 2 292 005 | 6/1976 | France . |
| WO 93/08014 | 4/1993 | WIPO . |
| WO 93/19125 | 9/1993 | WIPO . |

*Primary Examiner*—Leo B. Tentoni
*Attorney, Agent, or Firm*—Collard & Roe, P.C.

[57] ABSTRACT

With a process for manufacturing compostible thin-walled molded articles such as cups, plates, fast-food packagings, trays, flat sheets and the like, by applying a starch-based baking composition on the lower part of a multipart, preferably bipartite mold, to obtain a tough, durable article of high mechanical stability by using an essentially fat-free baking composition composed of water, a starch product, a release agent, and optionally further conventional additives, by baking the baking composition filling the mold, and by conditioning the resulting product to establish a moisture content of 6–22% by weight, the invention proposes the use, in addition to or instead of starch, of at least one modified starch selected from the group comprising starch esterified with organic acids or phosphoric acid, etherified starch, cross-linked starch and starch capable of being modified by ionic interaction.

12 Claims, No Drawings

PROCESS FOR MANUFACTURING COMPOSTIBLE THIN-WALLED MOLDED ARTICLES BASED ON STARCH

BACKGROUND OF THE INVENTION

The present invention relates to a process for manufacturing compostible thin-walled molded articles such as cups, plates, fast-food packagings, trays, flat sheets and the like, by applying a starch-based baking composition on the lower part of a multipart, preferably bipartite mold, to obtain a tough, durable article of high mechanical stability 1) by using an essentially fat-free baking composition that is composed of
   a) 42.0–60.0% by weight, preferably 45.0–56.0% by weight, water,
   b) 36.0–56.5% by weight, preferably 38.0–52.0% by weight, of a starch product
   c) 0.04–11% by weight, preferably 0.2–4.5% by weight, of one or more medium- or long-chain, optionally substituted fatty acids and/or salts thereof and/or acid derivatives thereof, e.g. acid amides, as a release agent—optionally using 0.5–6.5% by weight, preferably 0.1–4.2% by weight, of polymethylhydrogen siloxanes in combination with said compounds, or as a partial or occasionally as a complete substitute thereof, such that, when both groups of compounds are used and the concentrations of fatty acids and derivatives thereof are high, normally the concentration of polymethylhydrogen siloxanes is best not allowed to exceed 3% by weight, and optionally thickening agents such as swell-starch, pregelatinized starch or baking wastes, and/or guar gum, pectin, carob gum, carboxymethylcellulose and/or gum arabic; fibrous materials such as high-cellulose raw materials, vegetable raw materials, fibers of plastics, glass, metal and carbon; non-fibrous fillers such as calcium carbonate, carbon, talc, titanium dioxide, silica gel, alumina, shellac, soybean protein powder, wheat gluten powder, chicken egg protein powder, casein powder, and caseinate powder; colorants; preservatives and antioxidants;
2) by baking the baking composition filling the mold, and
3) by conditioning the resulting product to establish a moisture content of 6–22% by weight.

Such a process is described in our U.S. Pat. No. 5,376,320. Various starches and/or flours and flour mixtures are used as starch products there.

SUMMARY OF THE INVENTION

The type of starch used to produce the molded articles together with the co-use of additives and the manufacturing conditions determine the properties (weight, density, mechanical properties and the like) of the resulting product.

It has surprisingly been found that the molded articles show significantly increased stability when in addition to or in lieu of starch at least one modified starch chosen from the group comprising starch esterified with organic acids or phosphoric acid, etherified starch, cross-linked starch and starch capable of being modified by ionic interaction is used.

While the starch derivatives used to date in the known formulations have been employed mainly because of their thickening action, e.g. pregelatinized starch, thereby keeping a check on sedimentation of individual ingredients of the baking composition, the additives of the invention are found to have an effect on structure formation and stability.

Starch, most important natural starches consisting of amylose (17–31%) and amylopectin (69–83%), is organized in granular structure, one grain consisting of a large number of amylose and amylopectin molecules of high chain length (greater than 1000 glucose units). Per glucose unit 3 OH groups of amylose are available for substitution, equally so with amylopectin, with the exception of the branching positions, here 2 free OH.

Starch derivatives are characterized by several important indicators:

DS (degree of substitution) average number of substituted positions per glucose unit Maximum=3, frequently used from less than 0.001 to 0.2, i.e. less than 1 to 200 substituted positions per 1000 glucose units % substitution (% by weight substituents in total dry substance)

Indication of DS or % substitution is depending on method of derivatization and determinability.

The said starch derivatives (esterified starch, etherified starch and cross-linked starch) are outwardly (microscopically) unchanged granules of starch. They must show two mutually balanced activities.

1. Facilitation of swelling of the grain by monofunctional esterification, etherification i.e. water binding and gelatinization at lower temperatures. Consequence: faster, further-reaching gelatinization during the baking process, thus better exploitation of the "binding force" of starch.
2. Cross-linking of grain structures limiting swelling, water is absorbed and retained, but no unlimited swelling and thus bursting of the grain. A denser and more stable structure as a result.

1a) esterification with organic acids:

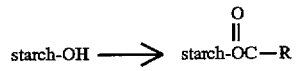

$R=CH_3$ acetylation, DS up to 0.12

$R=CH_2-CH_2-COOR_1$ succinylation, max. 4% succinic anhydride $R_1=H$, Na or other counterion, depending on pH and salts/bases used $R=CHR_2-CHR_3-COOR_1$, alkenyl succinylation, max. 3% alkenyl succinic anhydride $R_2=H$ and $R_3=$alkenyl or $R_2=$alkenyl and $R_3=H$ Alkenyl=Octenyl, decenyl for example

| Example: | | Gelatinization temperature |
|---|---|---|
| Corn starch | | 62–72° C. |
| acetylation at DS | 0.04 | 56–63° C. |
| | 0.08 | 48–56° C. |
| (R = COCH₃) | 0.12 | 41–51° C. |

(Leach et. al, Cer. Chem 36, 564, 1959)
Example: succinic acid ester

| % substitution | Gelatinization temp. degrees C. | Swelling at room temp. ml/25 g |
|---|---|---|
| 0 | 72 | 34 |
| 1 | 67 | 35 |
| 2 | 65 | 40 |
| 3 | 63 | 47 |
| 4 | 58 | 49 |

(O. B. Wurzburg, Modified starches, CRC Press, 1986, p. 133)

The esters are not stable under alkaline conditions, therefore etherification is preferable.

1b) Monofunctional esterification with phosphoric acid:

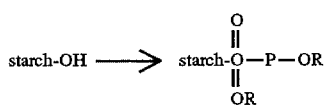

R=H, Na or other counterion, depending on pH and salts/bases used
DS=0.005–0.1, preferably less than 0.05, max. 0.5% P in the derivative; from approximately DS 0.07 upwards gelatinization at room temperature.
1c) Etherification: starch—OH→starch—O—R
R=CH$_2$—CH$_2$—OH hydroxyethyl ether
R=(CH$_2$)$_3$—OH hydroxypropyl ether
DS=0.01–0.2, preferably 0.02 to 0.1

The substitution effects described apply in principle to all important types of starch (corn, potato, tapioca, wheat) as well as to cationic starches.

The influence of cross-linking is of particular importance with potato starch, as it shows extreme swelling and dissolution of the granular structure.

|  | water absorption g/g starch | mean aggregate volume ml/g | packing density |
|---|---|---|---|
| corn | 15.1 | 35.5 | 0.45 |
| potato | 115.0 | 405.0 | 0.24 |
| tapioca | 21.9 | 59.5 | 0.38 |

(Evans, Haisman, J. Texture Studies 10, 347, 1979)

2) Cross-linking:
1. Phosphate cross-linking with sodium trimetaphosphate or phosphorus oxychloride

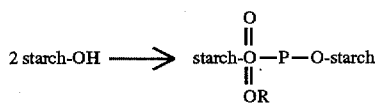

R=H, Na or other counterion, depending on conditions DS=1.10$^{-4}$ to 1.10$^{-2}$, preferably 5.10$^{-4}$ to 5.10$^{-3}$, max. phosphorus content 0.14% (0.04% from cross-linking)

2. Dicarboxylic acid cross-linking 2 starch—OH→starch—O—CO—(CH$_2$)$_n$—CO—O—starch e.g. n=4: adipic acid cross-linking, max. 0.12% adipic anhydride 3. Glycerol cross-linking 2 starch—OH→starch—O—CH$_2$—CHOH—CH$_2$—O—starch max. 0.3% epichlorohydrin or 0.6% acrolein The importance of cross-linking becomes apparent when observing the processes related to increasing swelling and gelatinization.

The water absorption, reversible up to approximately 50° C., and swelling of starch granules increases as the temperature rises. Partly crystalline structures are dissolved and viscosity increases strongly, as the increasingly swelling starch granules increasingly bind the free water. Parts of the starch, especially amylose, are released and serve as glue. As swelling continues, the swollen granules are destroyed and viscosity decreases markedly, especially in the case of potato starch.

This excessive swelling is to be prevented by slight structural cross-linking.

The preferable derivative according to the invention is:
1. a starch ether (hydroxypropyl ether): thereby swelling and gelatinization at lower temperatures and simultaneously
2. a cross-linked starch (phosphate-ester linkages): limiting and slowing down swelling, water being better bound, no bursting of the granular structure.

Other derivatives with similar characteristics are:
1) Starch esters for example with a) acetic acid, b) succinic acid, c) phosphoric acid, or d) alkenyl succinic acid; thereby earlier swelling and gelatinization.
2a) Cross-linking via dicarboxylic acid, phosphate and glycerin groups to limit swelling and bursting
2b, c) No chemical cross-linking, but free carboxylic groups, native or by substitution, such as from succinic acid, octenyl succinic acid. These groups also lead to products with greater density and strength due to coordination compounds with bivalent and trivalent ions (Ca, Mg, Al) and with silicates.

The degree of substitution of the starch derivatives should be less than 0.2.

Generally speaking, the gelatinization temperature should be lowered by at least 2° C., preferably 5° C., by derivatization to observe an effect.

With starch modified by ionic interaction, a "bridge function" similar to cross-linking may be assumed with the ionic groups stated below.

With the following substances an intensifying effect may be observed:
1. Aluminum sulfate An influence of aluminum ions was observed in the concentration range 0.05–0.15 g Al$_2$(SO$_4$)$_3$ per 100 g starch. There is no analogy to the seizing of paper, as the batter pH is about neutral or above, conditions where aluminum hydroxide starts precipitating.
2. Alkali silicates Addition of water glass solutions in the range of 0.1–1.0% of starch leads to a significant structure consolidation. This happens despite the high pH of 7.5–9.0 in the batter, which normally causes an opposite effect.
3. Dicalcium phosphate, calcium silicate Dicalcium phosphate and calcium silicate also lead to a consolidation of the structure when added at 0.1–2.0% of starch. The little soluble salts have only a minor influence on the pH of the batter.

With other phosphates, such as monocalcium phosphate, tricalcium phosphate or pyrophosphates as well as other calcium salts no such effect can be observed.

DESCRIPTION OF THE PREFERRED EMBODIMENTS

EXAMPLE 1

Production of trays; 235×175×14 mm addition of potato starch succinic acid ester derivative

| Ingredient/recipe no. | 1 | 2 | 3 |
|---|---|---|---|
| Starch (1) | 100 | 80 | 50 |
| Water | 100 | 100 | 100 |
| Starch derivative (4) | — | 20 | 50 |
| Thickening agent (2) | 0,5 | 0,5 | 0,5 |
| Release agent (3) | 2 | 2 | 2 |
| Viscosity, mPas, 24° C. | 1400 | 1500 | 3100 |
| Baking time, sec. | 155 | 160 | 190 |
| Baking temperature, °C. | 190 | 190 | 190 |
| Weight, g | 16,1 | 21,4 | 22,0 |
| Weight, % | 100 | 133 | 137 | pH value 7,4; conditioning 70% r.h., 27° C., 24 hours. (1) potato starch; (2) guar; (3) magnesium stearate; (4) succinic acid ester of potato starch, 4% substitution Resistance to compression test: testing the maximum force required to compress the specimens by 30% according to a relative method has shown the following results. Number of specimens per trial: 10

| Recipe no. | Weight | | Maximum force | | |
|---|---|---|---|---|---|
| | g | N | % | s(1) | s, % |
| 1 | 16,1 | 95 | 100 | 31 | 33 |
| 2 | 21,4 | 337 | 355 | 45 | 13 |
| 3 | 22,0 | 468 | 493 | 51 | 11 |

(1) Standard deviation N, n = 10 (n = 9 with no. 3)

A bending test showed no significant differences in the force required to break the specimens.

EXAMPLE 2

Production of ampoule tray, 80×65×13 mm; addition of starch ether derivativ with phosphate cross-linking

| Ingredient/recipe no. | 4 | 5 | 6 | 7 |
|---|---|---|---|---|
| Starch (1) | 100 | 90 | 70 | — |
| Water | 100 | 100 | 100 | 100 |
| Starch derivative (4) | — | 10 | 30 | 100 |
| Thickening agent (2) | 0,5 | 0,5 | 0,5 | 0,5 |
| Release agent (3) | 2 | 2 | 2 | 2 |
| Baking time, sec. | 32 | 33 | 36 | 44 |
| Baking temperature, °C. | 185 | 185 | 185 | 185 |
| Weight, g | 1,78 | 1,85 | 2,00 | 2,88 |
| Weight, % | 100 | 104 | 112 | 162 | conditioning 72% r.h., 26° C., 24 hours.
(1) potato starch; (2) guar; (3) magnesium stearate; (4) hydroxypropyl ether, cross-linked

EXAMPLE 3a

Rectangular cup, 110×120×48 mm; addition of alkali silicates

| recipe no. | 8 | 9 | 10 | 11 | 12 | 13 |
|---|---|---|---|---|---|---|
| Ingredient | | | | | | |
| Starch (1) | 100 | 100 | 100 | 100 | 100 | 100 |
| Water | 120 | 120 | 120 | 120 | 120 | 120 |
| Fiber (4) | 10 | 10 | 10 | 10 | 10 | 10 |
| Thickening agent (2) | 0,5 | 0,5 | 0,5 | 0,5 | 0,5 | 0,5 |
| Release agent (3) | 2 | 2 | 2 | 2 | 2 | 2 |
| Soda waterglass | — | 0,3 | 0,5 | 0,7 | 1 | 2 |
| Viscosity, mPas, 22° C. | 1500 | 1400 | 1300 | 1300 | 1200 | — |
| pH value | 7,6 | 8,9 | 9,0 | 9,4 | 9,5 | >10 |
| Baking time, sec. | 90 | 90 | 90 | 90 | 90 | 90 |
| Baking temperature °C. | 200 | 200 | 200 | 200 | 200 | 200 |
| Weight, g, without cond. | 8,5 | 9,0 | 10,3 | 12,1 | 14 | 16 |
| Weight, % | 100 | 106 | 121 | 142 | (165) (5) | (188) (5) | conditioning 70% r.h., 27° C., 24 hours.
(1) potato starch; (2) guar; (3) magnesium stearate; (4) cellulose; (5) partly formation of cracks

EXAMPLE 3b

Rectangular cup, 110×120×48 mm; addition of alkali silicates

| Ingredient/recipe no. | 14 | 15 | 15a | 16 |
|---|---|---|---|---|
| Starch (1) | 100 | 100 | 100 | 100 |
| Water | 130 | 130 | 130 | 130 |
| Fiber (4) | 10 | 10 | 10 | 10 |
| Thickening agent (2) | 0,3 | 0,3 | 0,3 | 0,3 |
| Release agent (3) | 2 | 2 | 2 | 2 |
| Potassium waterglass | — | 0,5 | 1 | 0,5(5) |
| Calcium silicate | 5 | — | — | — |
| Viscosity, mPas, 22° C. | 1300 | 1200 | 1400 | 1300 |
| pH value | 7,6 | 9,1 | 9,7 | 7,5 |
| Baking time, sec. | 90 | 90 | 90 | 90 |
| Baking temperature, °C. | 200 | 200 | 200 | 200 |
| Weight, g, without cond. | 9,5 | 9,7 | 11,0 | 8,7 | conditioning 70% r.h., 27° C., 24 hours.
(1) potato starch; (2) guar; (3) magnesium stearate; (4) cellulose; (5) neutralized with 12 ml 0,1 N hydrochloric acid

EXAMPLE 4

Production of flat tray, 235×175×12 mm, wall thickness 4 mm, different additions of potato starch derivatives

| Ingredient/recipe no. | 17 | 18 | 19 | 20 |
|---|---|---|---|---|
| Starch (1) | 100 | 90 | 80 | 70 |
| Water | 100 | 100 | 100 | 100 |
| Starch derivative (4) | — | 10 | 20 | 30 |
| Thickening agent (2) | 0,5 | 0,5 | 0,5 | 0,5 |
| Release agent (3) | 2 | 2 | 2 | 2 |
| Viscosity, mPas, 22° C. | 2000 | 2200 | 2000 | 2000 |
| Baking time, sec. | 150 | 155 | 160 | 160 |
| Baking temperature, °C. | 190 | 190 | 190 | 190 |
| Weight, g, without cond. | 15,3 | 16,3 | 17,3 | 18,8 |
| Weight, % | 100 | 107 | 113 | 123 | conditioning 72% r.h., 25° C., 24 hours
(1) potato starch; (2) guar; (3) magnesium stearate; (4) potato starch, hydroxypropylated, cross-linked

EXAMPLE 5

Production of a basket-like container, 115×80×38 mm, different additions of hydroxypropylated potato starch

| Ingredient/recipe no. | 21 | 22 | 23 | 24 |
|---|---|---|---|---|
| Starch (1) | 100 | 80 | 50 | — |
| Water | 100 | 100 | 100 | 100 |
| Starch derivative (4) | — | 20 | 50 | 100 |
| Thickening agent (2) | 0,5 | 0,5 | 0,5 | 0,5 |
| Release agent (3) | 2 | 2 | 2 | 2 |
| Viscosity, mPas, 22° C. | 1450 | 1800 | 3300 | >10000 |
| Baking time, sec. | 60 | 55 | 55 | 55 |
| Baking temperature, °C. | 185 | 185 | 185 | 185 |
| Weight, g | 4,3 | 4,6 | 4,9 | 5,3 |
| Weight, % | 100 | 108 | 113 | 123 | conditioning 72% r.h., 25° C., 24 hours
(1) potato starch; (2) guar; (3) magnesium stearate; (4) propoxylated potato starch Resistance to compression test: testing the maximum force required to compress the specimens by 30% according to a relative method has shown the following results. Number of specimens per trial: 10

| Recipe no. | Weight of tray, g | Maximum force N | % | s(1) | s, % |
|---|---|---|---|---|---|
| 21 | 4,3 | 128 | 100 | 17 | 13 |
| 22 | 4,6 | 155 | 121 | 17 | 11 |
| 23 | 4,9 | 160 | 125 | 22 | 14 |
| 24 | 5,3 | 173 | 135 | 35 | 20 |

(1) Standard deviation N, n = 12

EXAMPLE 6

Production of rectangular conical container, 145×90×50 mm; different additions of an octenyl succinate ester

| Ingredient/recipe no. | 25 | 26 | 27 | 28 |
|---|---|---|---|---|
| Starch (1) | 100 | 90 | 80 | 60 |
| Water | 110 | 110 | 110 | 110 |
| Starch derivative (4) | 0 | 10 | 20 | 40 |
| Thickening agent (2) | 0,5 | 0,5 | 0,5 | 0,5 |
| Release agent (3) | 2 | 2 | 2 | 2 |
| Viscosity, mPas, 22° C. | 1500 | 1480 | 1520 | 1700 |
| pH value | 8,0 | 7,7 | 7,4 | 7,0 |
| Baking time, sec. | 70 | 68 | 60 | 58 |
| Baking temperature, °C. | 190 | 190 | 190 | 190 |
| Weight, g | 6,2 | 6,8 | 7,5 | 8,8 | conditioning 70% r.h., 10° C., 10 hours
(1) potato starch; (2) guar; (3) magnesium stearate; (4) corn starch, octenyl succinate Resistance to compression test: testing the maximum force required to compress the specimens by 30% according to a relative method has shown the following results. Number of specimens per trial: 10

| Recipe no. | Weight of tray, g | Maximum force N | % | s(1) | s, % |
|---|---|---|---|---|---|
| 25 | 6,2 | 74 | 100 | 16 | 22 |
| 26 | 6,8 | 114 | 154 | 16 | 14 |
| 27 | 7,5 | 156 | 211 | 16 | 10 |
| 28 | 8,7 | 219 | 296 | 40 | 18 |

(1) Standard deviation N, n = 10

EXAMPLE 7

Production of rectangular conical container, 145×90×50 mm

| Ingredient/recipe no. | 29 | 30 | 31 | 32 |
|---|---|---|---|---|
| Starch (1) | 100 | 75 | 75 | 75 |
| Water | 110 | 110 | 110 | 110 |
| Starch derivative (4) | — | 25 | — | — |
| Starch derivative (5) | — | — | 25 | — |
| Starch derivative (6) | — | — | — | 25 |
| Thickening agent (2) | 0,5 | 0,5 | 0,5 | 0,5 |
| Release agent (3) | 2 | 2 | 2 | 2 |
| Viscosity, mPas, 25° C. | 1750 | 1250 | 1800 | 3500 |
| Baking time, sec. | 75 | 67 | 63 | 63 |
| Baking temperature, °C. | 190 | 190 | 190 | 190 |
| Weight, g | 6,6 | 7,3 | 8,3 | 6,9 | conditioning 75% r.h., 12 hours, room temperature.
(1) potato starch; (2) guar; (3) magnesium stearate; (4) corn starch, hydroxypropyl ether; (5) corn starch, octenyl succinate; (6) corn starch, cationic, hydrophobic

EXAMPLE 8

Production of round plate, diameter 155 mm, 12 mm high

| Ingredient/recipe no. | 33 | 34 | 35 |
|---|---|---|---|
| Starch (1) | 100 | — | — |
| Water | 100 | 100 | 100 |
| Starch derivative (4) | — | 100 | — |
| Starch derivative (5) | — | — | 100 |
| Thickening agent (2) | 0,5 | 0,5 | 0,5 |
| Release agent (3) | 2,0 | 2,0 | 2,0 |
| Baking time, sec. | 60 | 70 | 75 |
| Weight, g, without conditioning | 6,0 | 9,5 | 10,5 | conditioning 70% r.h., 27° C., 24 hours.
(1) potato starch; (2) guar; (3) magnesium stearate; (4) corn starch, cationic, hydrophobic; (5) corn starch, octenyl succinate

EXAMPLE 9

Production of packaging trays, 130×105×30 mm

| Ingredient/recipe no. | 36 | 37 | 38 | 39 |
|---|---|---|---|---|
| Starch (1) | 100 | — | — | 100 |
| Water | 100 | 100 | 110 | 100 |
| Starch derivative (4) | — | — | 100 | — |
| Starch derivative (5) | — | 100 | — | — |
| Starch derivative (6) | — | — | — | 10 |
| Thickening agent (2) | 0,5 | 0,5 | 0,5 | — |
| Release agent (3) | 2 | 2 | 3 | 2 |
| Baking time, sec | 90 | 90 | 115 | 90 |
| Weight, g, without conditioning | 8,9 | 13,0 | 18,0(7) | 12,0 |

(1) potato starch; (2) guar; (3) magnesium stearate; (4) rice flour; (5) corn starch, cationic, DS = 0,04; (6) corn starch, propoxylated, pregelatinized; (7) isolated partial formation of cracks

EXAMPLE 10

Production of a tray, 135×220×19 mm; addition of different concentrations of Al ions

| Ingredient/recipe no. | 40 | 41 | 42 | 43 |
|---|---|---|---|---|
| Starch (1) | 100 | 100 | 100 | 100 |
| Water | 100 | 100 | 100 | 100 |
| Thickening agent (2) | 0,5 | 0,5 | 0,5 | 0,5 |
| Release agent (3) | 2 | 2 | 2 | 2 |
| Aluminum sulfate.xH$_2$O 55% Al$_2$(SO$_4$)$_3$ | — | 0,11 | 0,22 | 0,44 |
| corresponding to Al$^{3+}$ | 0 | 0,01 | 0,02 | 0,04 |
| Batter volume, ml | 30 | 32 | 34 | 37 |
| Batter temperature, °C. | 25 | 25 | 25 | 25 |
| Viscosity, mPas, ± 100 mPas | 1500 | 1500 | 1500 | 1500 |
| Baking time, sec., ± 5 sek. | 145 | 145 | 145 | 145 |
| Baking temperature, °C. | 190 | 190 | 190 | 190 |
| Weight, g (average) | 15,2 | 16,2 | 17,4 | 18,8 |
| Weight, % (relative) | 100 | 107 | 114 | 124 | conditioning 72% r.h., 12 hours, room temperature
(1) potato starch; (2) guar; (3) magnesium stearate

EXAMPLE 11

Production of rectangular conical container, 145×90×50 mm

| Ingredient/recipe no. | 44 | 45 | 46 | 47 | 48 |
|---|---|---|---|---|---|
| Starch (1) | 100 | 100 | 90 | 90 | 90 |
| Starch (4) | — | — | — | — | 10 |
| Starch derivative (5) | — | — | 10 | 10 | — |
| Water | 110 | 110 | 110 | 110 | 110 |
| Thickening agent (2) | 0,5 | 0,5 | 0,5 | 0,5 | 0,5 |
| Release agent (3) | 2 | 2 | 2 | 2 | 2 |
| Aluminum sulfate.xH$_2$O 55% Al$_2$(SO$_4$)$_3$ corresponding to Al$^{3+}$ | — | 0,15 0,013 | — | 0,15 0,013 | — |
| Viscosity, mPas, 22° C. | 800 | 800 | 850 | 1000 | 600 |
| pH value | 7,3 | 6,7 | 7,1 | 6,6 | 7,3 |
| Batter volume, ml | 15 | 15 | 17 | 17 | 16 |
| Baking time, sec. | 70 | 74 | 70 | 63 | 70 |
| Weight, g (average) | 6,83 | 7,17 | 7,31 | 7,38 | 6,92 |
| Weight, % (relative) | 100 | 105 | 107 | 108 | 101 |

Baking temperature 180/185° C., conditioning 72% r.h., 6 hours, 26° C.
(1) potato starch; (2) guar; (3) magnesium stearate; (4) corn starch; (5) corn starch derivative, octenyl succinate

EXAMPLE 12

Production of packaging tray, 130×105×30 mm

| Ingredient/recipe no. | 49 | 50 | 51 | 52 | 53 |
|---|---|---|---|---|---|
| Starch (1) | 100 | 100 | 100 | 100 | 100 |
| Water | 110 | 110 | 110 | 110 | 110 |
| Thickening agent (2) | 0,5 | 0,5 | 0,5 | 0,5 | 0,25 |
| Release agent (3) | 2 | 2 | 2 | 2 | 2 |
| Aluminum sulfate, anhydrous | — | 0,05 | 0,1 | 0,15 | 0,15 |
| Viscosity, mPas, 22° C. | 1400 | 1700 | 1800 | 1900 | 900 |
| pH value | 7,7 | 7,1 | 6,7 | 6,5 | 6,3 |
| Baking time, sec. | 65 | 65 | 70 | 70 | 73 |
| Baking temperature, °C. | 180 | 180 | 180 | 180 | 180 |
| Weight, g (average) | 8,3 | 8,7 | 9,6 | 9,0 | 9,8 |
| Weight, % (relative) | 100 | 105 | 116 | 118 | 118 | conditioning 72% r.h., 3 hours, 29° C.
(1) potato starch; (2) guar; (3) magnesium stearate Resistance to compression test: testing the maximum force required to compress the specimens by 30% according to a relative method has shown the following results. Number of specimens per trial: 10

| Recipe no. | Weight of g | specimen % | Al sulfate g/100 g starch | Maximum force N | Maximum force % |
|---|---|---|---|---|---|
| 49 | 8,25 | 100 | 0 | 98 | 100 |
| 50 | 8,70 | 105 | 0,05 | 118 | 120 |
| 51 | 9,62 | 117 | 0,1 | 133 | 136 |
| 52 | 9,70 | 118 | 0,15 | 153 | 156 |

(1) Standard deviation N, n = 10

EXAMPLE 13

Production of packaging tray, 130×105×30 mm (as in example 12)

| Ingredient/recipe no. | 54 | 55 | 56 |
|---|---|---|---|
| Starch (1) | 100 | 100 | 100 |
| Water | 100 | 100 | 100 |
| Thickening agent (2) | 0,5 | 0,5 | 0,5 |
| Release agent (3) | 2 | 2 | 2 |
| Calcium carbonat | — | 2 | — |
| Calcium hydrogen phosphate | — | — | 1 |
| Viscosity, mPas, 22° C. | 1500 | 1900 | 1300 |
| pH value | 7,6 | 8,9 | 7,3 |
| Baking time, sec. | 65 | 65 | 70 |
| Baking temperature, conditioning as in example 12 | | | |
| Weight, g | 9,03 | 8,61 | 9,57 |
| Weight, Relativ-% | 100 | 95 | 106 |
| Maximum force, N (4) | 11,8 | 12,3 | 14,2 |
| Maximum force, % (relative) | 100 | 104 | 120 |

(1) potato starch; (2) guar; (3) magnesium stearate; (4) measured at punched disc, 30 mm diameter

EXAMPLE 14

Production of a sorting insert, 195×65×16 mm

| Ingredient/recipe no. | 57 | 58 | 59 | 60 |
|---|---|---|---|---|
| Starch (1) | 100 | 100 | 100 | 100 |
| Water | 120 | 120 | 120 | 120 |
| Thickening agent (2) | 0,3 | 0,3 | 0,3 | 0,3 |
| Release agent (3) | 2 | 2 | 2 | 2 |
| Calcium hydrogen phosphate | — | 1,2 | — | — |
| Calcium phosphate | — | — | 1,25 | — |
| Calcium dihydrogen phosphate | — | — | — | 0,9 |
| pH value | 7,4 | 7,1 | 7,0 | 6,6 |
| Baking time, sec. | 28–30 | 28–30 | 28–30 | 28–30 |
| Baking temperature, conditioning as in example 13 | | | | |
| Weight, g | 5,01 | 5,55 | 5,45 | 5,37 |
| Weight, % (relative) | 100 | 111 | 109 | 107 |

EXAMPLE 15

Production of trays, 235×175×14 mm, addition of starch ester derivative

| Ingredient/recipe no. | 61 | 62 | 63 |
|---|---|---|---|
| Starch (1) | 100 | 50 | 0 |
| Water | 100 | 105 | 110 |
| Starch derivative (4) | — | 50 | 100 |
| Thickening agent (2) | 0,5 | 0,5 | 0,5 |
| Release agent (3) | 2 | 2 | 2 |
| Baking time, sec. | 170 | 180 | - (5) |
| Baking temperature, °C. | 190 | 190 | 190 | pH value 7,2; conditioning 73% r.h., 24° C.; 24 hours
(1) potato starch; (2) guar;. (3) magnesium stearate; (4) acetylated potato starch, E1422; (5) no longer properly shaped

We claim:

1. A process of manufacturing biodegradable, thin-walled baked shaped bodies in a multi-part baking mold, comprising the steps of
    (a) baking an essentially fat-free baking composition in the mold, the baking composition being composed of
       (1) 42.0–60.0%, by weight, of water,
       (2) 36.0–56.5%, by weight, of a starch product comprised of 0.0–54.5%, by weight, of a first starch base selected from at least one member of the group consisting of starch, various starches, a mixture of various starches, flour, various flours and a mixture of various flours, and 2.0–56.5%, by weight, of a second starch product selected from at least one member of the group consisting of a starch esterified with organic acids, a starch esterified with phosphoric acid, an etherified starch, a cross-linked starch and a starch modified by ionic interaction with an added salt, (3) 0.04–11%, by weight, of a release agent selected from at least one member of the group consisting of medium-chain and long-chain fatty acids and their salts, derivatives and amides, medium-chain and long-chain substituted fatty acids and their salts, derivatives and amides, and 0.5–6.5, by weight, of polymethylhydrogen siloxanes, (4) fibrous materials,
(5) non-fibrous fillers,
(6) colorants,
(7) preservatives, and
(8) antioxidants, and (b) conditioning the baked shaped bodies after baking to obtain a moisture content of 6–22%, by weight.

2. The manufacturing process of claim 1, wherein the baking composition contains 10.0–50.0%, by weight, of the first starch base.

3. The manufacturing process of claim 1, wherein the baking composition contains 2.0–28.0%, by weight, of the second starch base.

4. The manufacturing process of claim 1, wherein the baking composition contains 0.2–4.5%, by weight, of the release agent.

5. The manufacturing process of claim 1, wherein the baking composition contains 0.1–4.2% by weight, of the polymethylhydrogen siloxanes as the release agent.

6. The manufacturing process of claim 1, wherein the esterified starch of the second starch product is esterified with a member selected from the group consisting of acetic acid, succinic acid, alkenyl-substituted succinic acid and phosphoric acid.

7. The manufacturing process of claim 6, wherein the degree of substitution of the esterified starch is less than 0.2.

8. The manufacturing process of claim 1, wherein the etherified starch of the second starch product is etherified with a member selected from the group consisting of ethylene oxide and propylene oxide.

9. The manufacturing process of claim 8, wherein the degree of substitution of the etherified starch is less than 0.2.

10. The manufacturing process of claim 1, wherein the cross-linked starch of the second starch product is a starch cross-linked with a member selected from the group consisting of sodium methaphosphate, phosphorus oxychloride, dicarboxylic acid, adipic acid, epychlorohydrin and acrolein.

11. The manufacturing process of claim 10, wherein the degree of substitution of the etherified starch is less than 0.2.

12. The manufacturing process of claim 1, wherein at least one member of the group consisting of aluminum sulfate, an alkali silicate, dicalcium phosphate and calcium silicate is added to the starch of the second starch product.

* * * * *